(12) United States Patent
Blonskey et al.

(10) Patent No.: US 11,588,615 B2
(45) Date of Patent: Feb. 21, 2023

(54) MISSION CRITICAL COMMUNICATION LINK HUB

(71) Applicant: CoreTigo Ltd., Netanya (IL)

(72) Inventors: Ofer Blonskey, Even Yehoda (IL); Benny Zelman, Hod-Hasharon (IL); Omer Ephrat, Ramat Gan (IL)

(73) Assignee: CoreTigo, Ltd., Netanya (IL)

( * ) Notice: Subject to any disclaimer, the term of this patent is extended or adjusted under 35 U.S.C. 154(b) by 0 days.

(21) Appl. No.: 17/507,207

(22) Filed: Oct. 21, 2021

(65) Prior Publication Data

US 2022/0131682 A1 Apr. 28, 2022

Related U.S. Application Data

(60) Provisional application No. 63/104,670, filed on Oct. 23, 2020.

(51) Int. Cl.
*H04L 7/08* (2006.01)
*H04W 56/00* (2009.01)

(52) U.S. Cl.
CPC ............ *H04L 7/08* (2013.01); *H04W 56/0045* (2013.01)

(58) Field of Classification Search
CPC .......... H04B 7/08; H04J 3/06; H04W 56/0045
See application file for complete search history.

(56) References Cited

U.S. PATENT DOCUMENTS

| 2019/0132204 A1* | 5/2019 | McGrath | ............. H04L 41/0823 |
| 2021/0288412 A1* | 9/2021 | Blonskey | ............... H04B 15/02 |
| 2021/0306910 A1* | 9/2021 | Guo | .................... H04W 56/001 |

* cited by examiner

*Primary Examiner* — Gary Mui
(74) *Attorney, Agent, or Firm* — M&B IP Analysts, LLC

(57) ABSTRACT

A method for hub for interfacing between a wireless mission critical communication link (MCCL) and a wired MCCL. The hub includes a wired interface a providing a physical layer connectivity to the wired MCCL; a plurality of ports coupled to the wired interface; a wireless interface providing a physical layer connectivity to the wireless MCCL; and a processor; and a memory containing instructions that, when executed by the processing circuitry, configure the hub to: receive a signal from a primary device through the wireless MCCL; determine a wireless communication cycle of the primary device; determine a wired communication cycle of a secondary device, wherein the secondary device is connected via the wired MCCL; synchronize a start time of the wired communication cycle to a start of the wireless communication cycle; and send the received signal to the secondary device at the synchronized start time of the wired communication cycle.

17 Claims, 6 Drawing Sheets

MISSION CRITICAL COMMUNICATION LINK HUB

CROSS-REFERENCE TO RELATED APPLICATIONS

This application claims the benefit of U.S. Provisional Application No. 63/104,670, filed on Oct. 23, 2020, the contents of which are hereby incorporated by reference.

TECHNICAL FIELD

The present disclosure relates generally to a system and method for providing communication. More specifically, the present disclosure provides for a system and method for providing communication between wireless and wired devices employing a critical link communication protocol.

BACKGROUND

In recent years, communication among machinery such as connected robots, with processing devices in industrial settings have become more prevalent. As such, the demand for delivery of increasingly complex feedback information and operating instructions at lower latency has grown. With advances in communication equipment, machines are continuously being retrofitted with new sensors and both wireless and wired communication equipment, operating under new communication protocols that work with existing wired communication equipment operating under an existing protocol.

Often, the operation of new and old communication protocols, as in the case between wired and wireless devices, create constant latency in communication, both in communicating from a processor to a machine, and from the machine feeding back sensed information back to the processor. While converters may be used to allow for communication between wired and wireless devices, the converters themselves create an additional range of latencies, depending on their compatibility with the wired and wireless communication devices. In this case, the occurrence of a range of latencies create uncertainties and jitters in the signals sent from the processor to the devices, and vice-versa.

In view of the above discussion, there is a need to provide a solution that would allow inter-communication between wired and wireless devices without or with minimum latency.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing communication between a wireless mission critical communication link (MCCL) and a wired MCCL. The method comprises receiving a signal from a primary device through the wireless MCCL; determining a wireless communication cycle of the primary device; determining a wired communication cycle of a secondary device, wherein the secondary device is connected via the wired MCCL; synchronizing a start time of the wired communication cycle to a start of the wireless communication cycle; and sending the received signal to the secondary device at the synchronized start time of the wired communication cycle.

Certain embodiments disclosed herein also include a hub for interfacing between a wireless mission critical communication link (MCCL) and a wired MCCL, comprising: a wired interface a providing a physical layer connectivity to the wired MCCL; a plurality of ports coupled to the wired interface; a wireless interface providing a physical layer connectivity to the wireless MCCL; and a processor; and a memory, the memory containing instructions that, when executed by the processing circuitry, configure the hub to: receive a signal from a primary device through the wireless MCCL; determine a wireless communication cycle of the primary device; determine a wired communication cycle of a secondary device, wherein the secondary device is connected via the wired MCCL; synchronize a start time of the wired communication cycle to a start of the wireless communication cycle; and send the received signal to the secondary device at the synchronized start time of the wired communication cycle.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
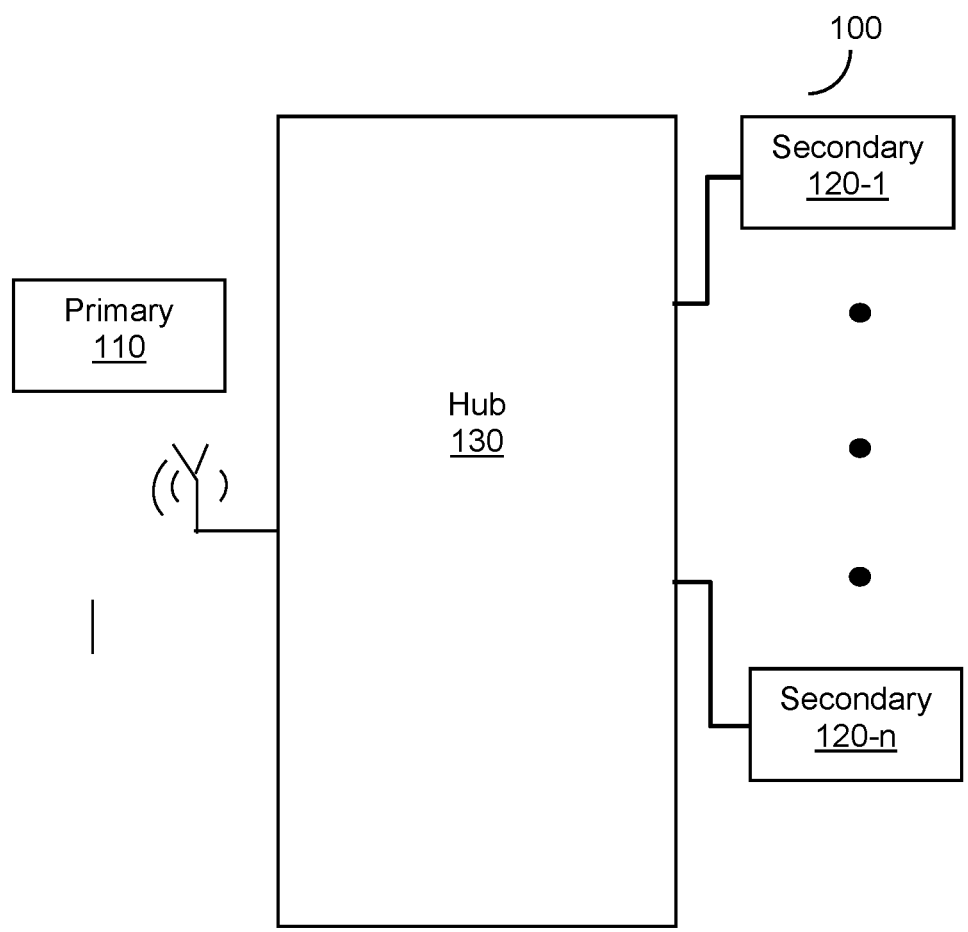
FIG. 1 is a block diagram of a system for communicatively connecting devices utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a hub for providing communication between a primary device and a secondary device. The disclosed hub is a mission critical communication link, configured to provide for a bridge for a primary device to wirelessly communicate with existing wired secondary devices, via a critical link communication protocol via synchronization of communication cycles. The hub provides decreased signal latency and more predictability in the timing of data transfer.

FIG. 1 shows an example diagram 100 demonstrating the communication of a hub to devices according to one embodiment. In the example diagram 100, a primary device 110 and a plurality of secondary devices 120-1 to 120-n (hereinafter secondary device 120 or secondary devices 120) are communicatively connected to each other by a hub 130. In an embodiment, the primary device 110, as known as a master device or a parent device, communicates with the hub 130 wirelessly using Radio Frequency (RF) waves to provide instructions to the hub 130. Also, the secondary device 120 communicates with the hub 130 via cables connected to ports (not shown), as will be described in more detail in FIG. 2. In an embodiment, the secondary device 120 is configured to receive signals from the hub 130 to operate and implement requested actions from the primary device 110, based on the instruction signals sent from the primary device 110 and synchronized by the hub 130 to minimize latency. Examples of the secondary device 120 may include a vacuum pump or a robotic arm with analogue rotary motors and grip control. The secondary device 120 may additionally include sensors that provide feedback for the primary device 110.

In an embodiment, the primary device 110 connects and communicates via a wireless mission critical communication link (MCCL), while each secondary device 120 connects and communicates via a wired MCCL. In other configurations, the primary device 110 may connect using a wired MCCL while the secondary device may connect using a wireless MCCL. The wireless MCCL may include a system using a standardized and commercially available wireless protocol, such as, but not limited to, a wireless protocol is a Bluetooth Low Energy (BLE) protocol and an IO-Link® Wireless. The IO-Link® Wireless link is defined in the IO-Link® Wireless System Specification, first version published in March 2018. The wired MCCL may include a USB and a wired IO-Link®.

The hub 130 is configured to bridge communication between the primary device 110 and each of the secondary devices 120 that is connected to the hub 130. In an embodiment, the hub 130 wirelessly receives instructions from the primary device 110, performs processing of the instructions, and relays the processed instructions to the secondary device 120. Also, the hub 130 is configured to receive feedback information by wire from the secondary device 120, down-convert the information from wired to wireless communication protocol and transmit the down-converted information to the primary device 110. As will be explained in more detail in FIG. 2, the hub 130 is configured to synchronize signals received wirelessly so that it can then be transmitted by wire to secondary devices with minimal latency. The hub 130 is further configured to receive feedback signals from the secondary devices 120, process the feedback, and send the processed feedback to the primary device 110.

Figure 2:
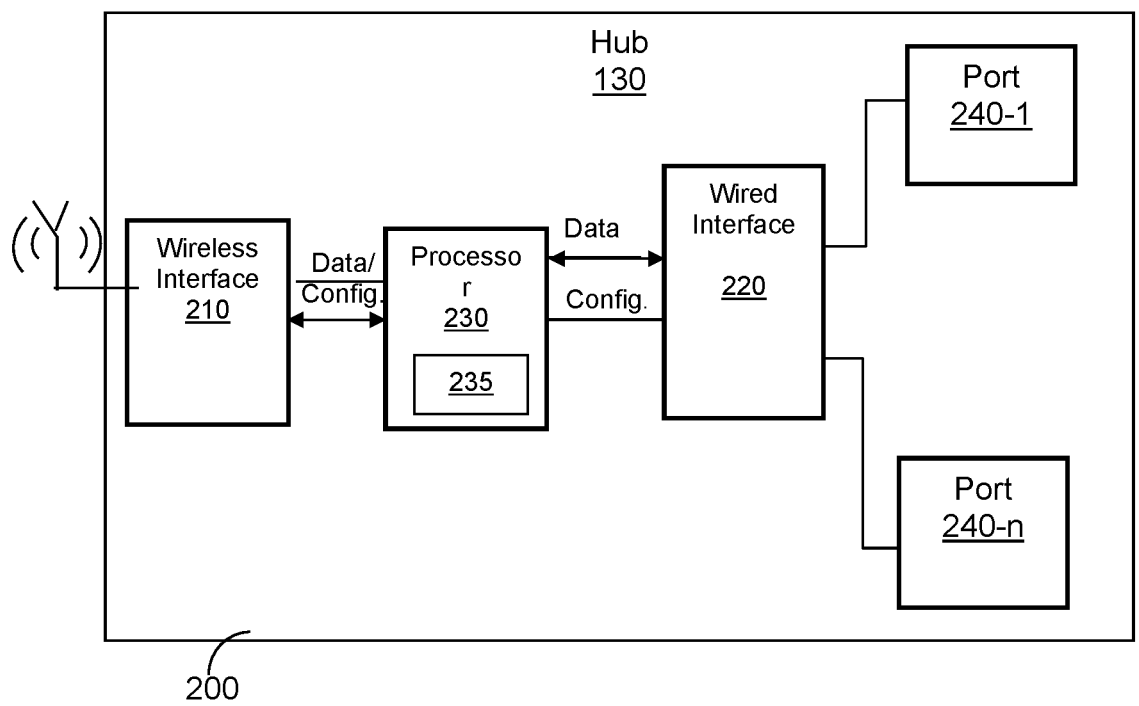
FIG. 2 is a block diagram showing the detailed structures of the hub, according to an embodiment.

FIG. 2 is an example block diagram 200 of the hub 130, according to an embodiment. The hub 130 includes a wireless interface 210 and a wired interface 220 both connected to a processor 230. The wireless interface 210 implements a physical layer of a wireless mission critical communication link (MCCL). The wired interface 220 implements a physical layer of a wired MCCL. The hub 130 also includes MCCL wired ports 240-1 to 240-n (hereinafter port 240 or ports 240), that provide wired connection to external to the hub 130. As noted above, the MCCL includes, but is not limited to, IO-Link and IO-Link wireless, where both are standardized protocols.

In an embodiment, the wireless interface 210 receives data from the primary device 110 and relays the data, referred to as PDOut data to the processor 230 for further processing and distributing to the secondary devices 120 connected to the wired port(s) 240. Also, the wireless interface 210 receives aggregated feedback and sensing data, referred to as PDin data, from the secondary devices 120 connected to the respective wired port(s) 240 via the processor 230. The wireless interface 210 then broadcasts the aggregated feedback and sensing data to the primary device 110.

The wired interface 220 is connected to the secondary device 120 by wire via wired ports 240.

The processor 230 is configured to receive signals from both the wireless and wired interfaces 210 and 220. In an embodiment, the processor 230 is configured to convert MCCL wireless signals, comply with a first MCCL protocol into wired MCCL signals, and comply with a second MCCL protocol. The converted signals are transferred by the wired interface 220 to the wired port 240-1 and the secondary devices (e.g., devices 120, FIG. 1).

In an embodiment, the processor 230 may also convert wired MCCL signals, derived, e.g., from feedback sensors of the secondary devices 120, into MCCL wireless signals for communication between the primary device 110 and the wireless interface 210. The processor 230 further supports timing synchronization between the wired and wireless communication cycles, such as discussed below. The processor 230 allows for timing synchronization of all the ports 240 and may be able to select specific ports 240 for synchronization or disable synchronization of all ports 240.

In an example embodiment, the first MCCL protocol (providing wireless MCCL signals) is IO-Link® Wireless protocol, while the second MCCL protocol (providing wired MCCL signals) is IO-Link® protocol.

The processor 230 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, and the like, or any other hardware logic components that can perform calculations or other manipulation of information.

The processor 230 may include a memory 235. The memory 235 may be a volatile memory such as, but not limited to random access memory (RAM), or non-volatile memory (NVM), such as, but not limited to, Flash memory. The memory 235 stores software to allow the hub 130 to function as discussed below. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processor 230 to perform the various functions described in further detail herein.

Figure 3:
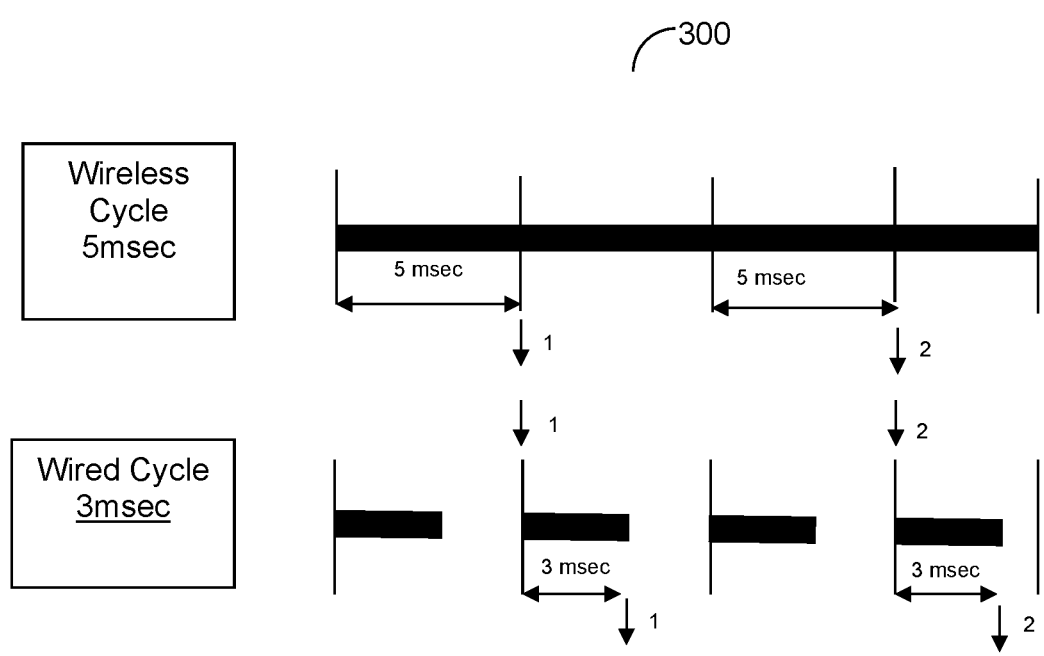
FIG. 3 is a chart illustrating timing synchronization of communication cycle between the wired and wireless devices during transmission of signal from a primary device to a secondary device, according to an embodiment.

FIG. 3 is an example chart 300 illustrating timing synchronization of communication cycle between the wired and wireless devices during transmission of signal from a primary device to a secondary device, according to an embodiment. FIG. 3 will be discussed with reference to the elements shown in FIG. 2.

In the embodiment, the wireless communication cycle between the primary device 110 and the wireless interface 210 is about 5 msec, while the wired communication cycle between the secondary devices 120 and the wired interface 220 via the wired port 240 is about 3 msec. In order to synchronize the cycles with minimal time lag, the wired communication cycle start time is determined based on the start of the wireless cycle for data transmission. That is, the wired communication cycle start time is synced with that of the wireless communication cycle start time. Also, timing synchronization may be applied to all the wired Port-1, or only to some of the ports 240. In other words, both wireless and the wired devices cycle simultaneously, or at substantially the same time, according to the starting time of the wireless cycle.

Therefore, as the processor 230 receives the wireless signals from the wireless interface 210, the signal may then immediately be transferred out via the wired interface 220 to the wired port 240 and through to the secondary device (120, FIG. 1), thereby causing minimal additional latency time while the signal is traveling within the hub 130. In the example as shown in FIG. 3, latency time is constant at 5 msec for the wireless communication cycle, and 3 msec at the wired communication cycle, for total constant latency of 8 msec.

That is, by syncing the wireless cycle start time with the wired cycle start time, the timing uncertainty while the signal is being transferred through the hub 130 may be greatly reduced, to about 1 msec, in an embodiment.

Figure 4:
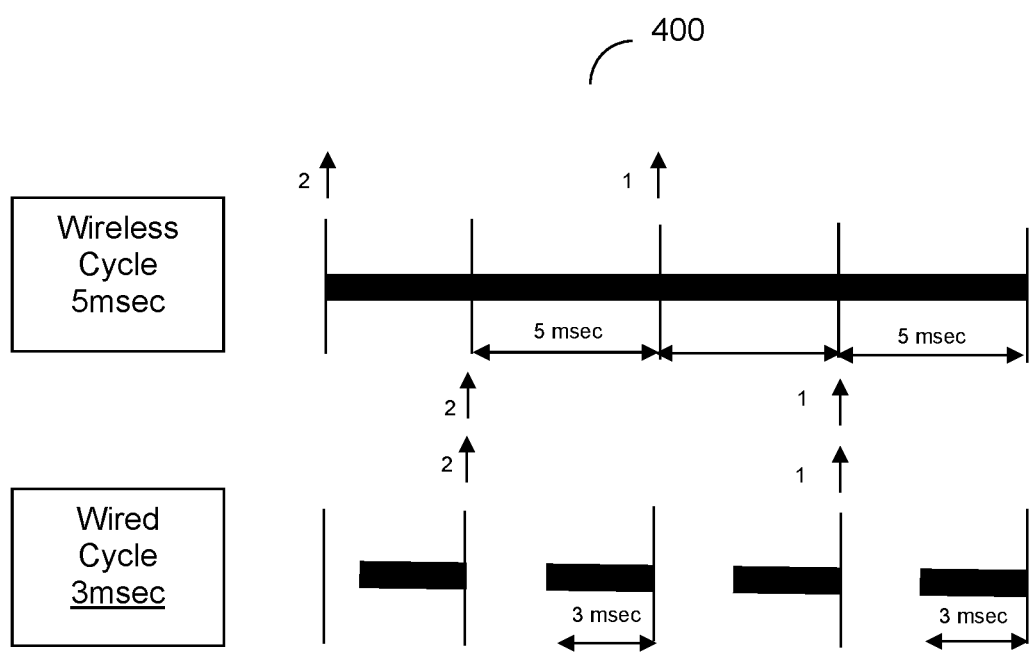
FIG. 4 is a chart illustrating timing synchronization of communication cycle between the wired and wireless devices during transmission of feedback signal from a secondary device to a primary device, according to an embodiment.

FIG. 4 is an example chart 400 illustrating timing synchronization of communication cycle between the wired and wireless devices during transmission of feedback signal from a secondary device to a primary device, according to an embodiment. FIG. 4 will be discussed with reference to the elements shown in FIGS. 1 and 2.

The transmission of feedback signal from the secondary device 120 to the primary device 110 may occur from sensors placed near the secondary device 120, for example. As is the case in FIG. 3, the wireless communication cycle between the primary device 110 and the wireless interface 210 is about 5 msec, while the wired communication cycle between the secondary devices 120 and the wired interface 220 via the wired port 240 is about 3 msec. In order to synchronize the cycles with minimal time lag, the wired communication cycle start time is also determined based on the start of the wireless cycle for data transmission. That is, the wired communication cycle start time is still synced with that of the wireless communication cycle start time. Also, timing synchronization may be applied to all of the MCCL Port-1, or only to some of the ports. In other words, both wireless and the wired devices cycle simultaneously, or at substantially the same time, according to the starting time of the wireless cycle.

Here, the processor 230 receives the wired signals from the wired interface 220, during the concurrent wireless communication cycle. The signal is then transferred out via the wireless interface 210 to the primary device 110 during the next wireless communication cycle, resulting in constant minimal additional latency time while the signal is traveling within the hub 130. In the example as shown in FIG. 4, latency time is constant at 5 msec or multiplication of 5 msec for the wireless communication cycle, and less than 400 usec at the wired communication cycle that occurs during the previous 5 msec wireless communication cycle, for total constant latency of 10 msec or less.

That is, by synchronizing the wireless cycle start time with the wired cycle start time, the timing uncertainty while the signal is being transferred through the hub 130 may be greatly reduced, to about 2 msec, in the embodiment.

Figure 5:
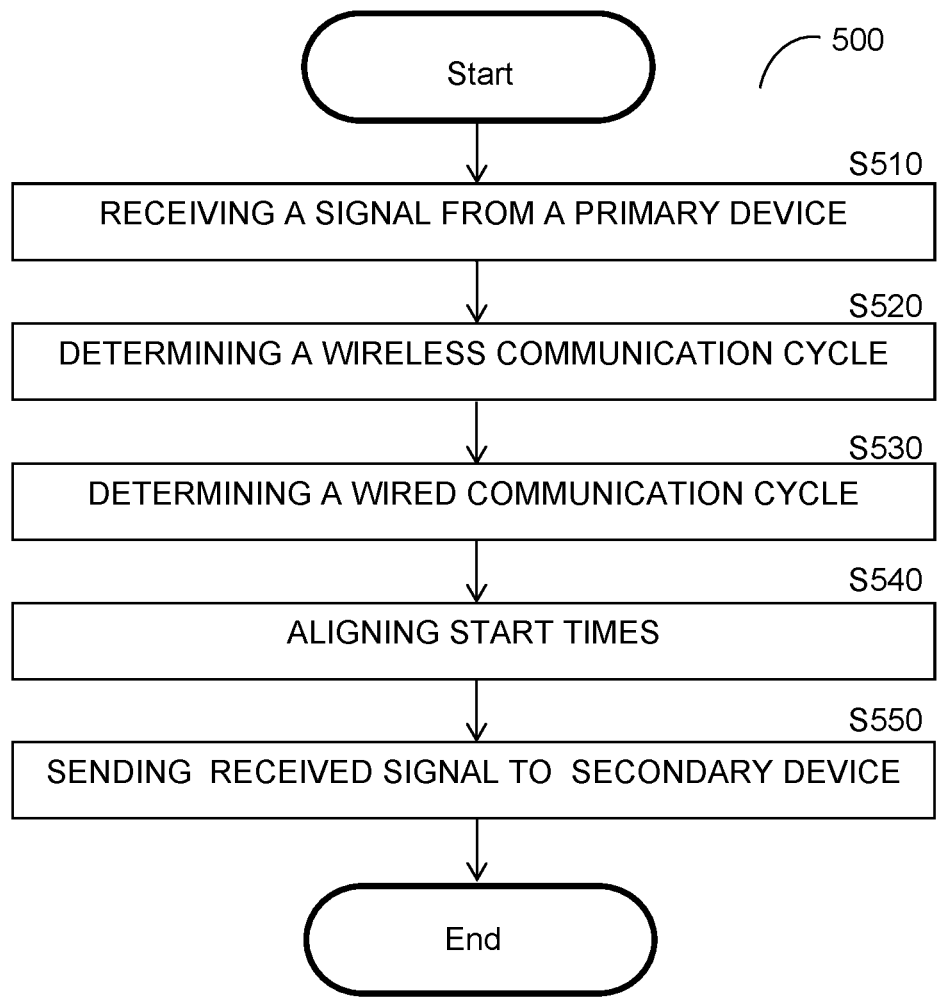
FIG. 5 is a flowchart illustrating a method of synchronizing communication cycle between the wired and wireless devices during coupling, according to an embodiment.

FIG. 5 is an example flowchart 500 illustrating a process of synchronizing communication cycle between the wired and wireless devices during coupling, according to an embodiment. In an embodiment, the process may be performed by the processor 230 within the hub 130.

At S510, a signal is received from a primary device over a wireless MCCL. Next, at S520, a wireless communication cycle between the primary device in communication with the wireless MCCL is determined. Then, at S530, a wired communication cycle between the wired MCCL and the secondary device via the wired port is determined. Afterwards, at S540, a start time of the wired communication cycle is aligned, or synchronized, to a start of the wireless communication cycle. The alignment may include configuring the wired communication cycle based on the wireless communication cycle.

At S550, the received signal is then sent to the secondary device at the start time of the wired communication cycle that has been aligned to the start time of the wireless communication cycle.

Figure 6:
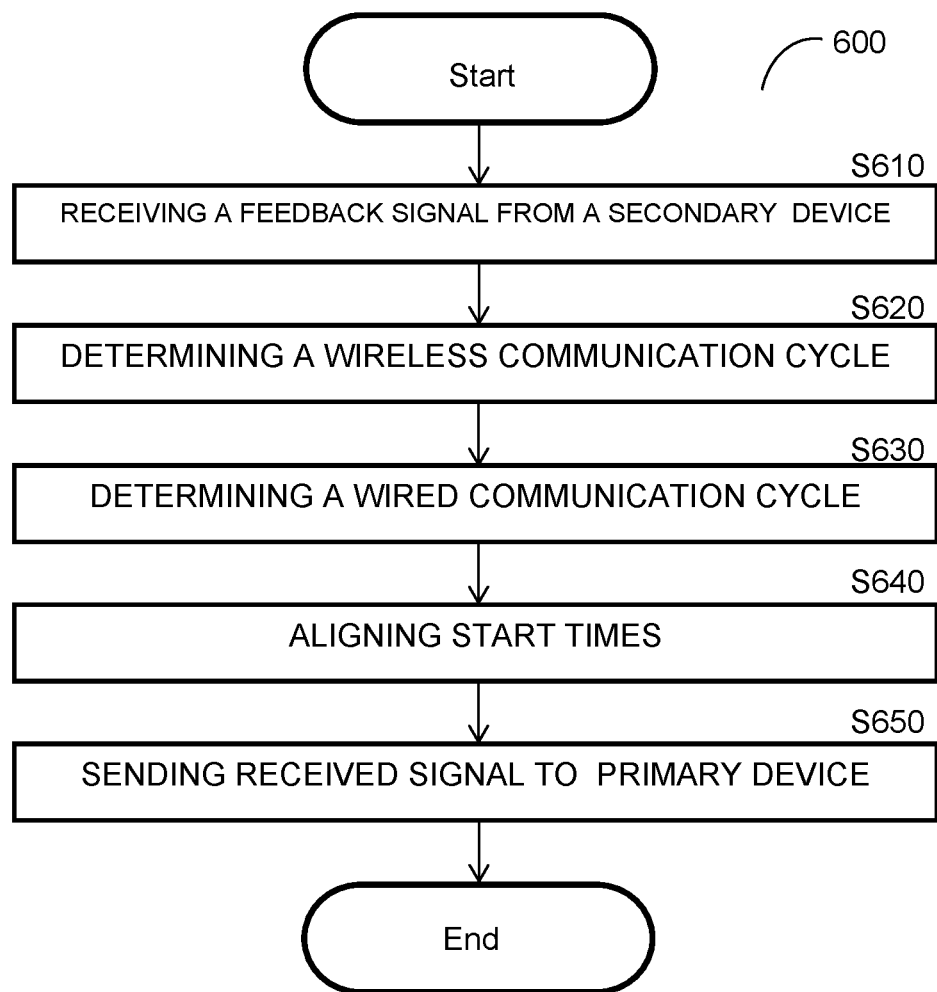
FIG. 6 is a flowchart illustrating a method of synchronizing communication cycle between the wired and wireless devices during decoupling, according to an embodiment.

FIG. 6 is an example flowchart 600 illustrating a method of synchronizing communication cycle between the wired and wireless MCCL during decoupling, according to an embodiment. As in FIG. 5, the process may be performed by the processor 230 within the hub 130.

At S610, a feedback signal is received from a secondary device over a wired MCCL. In an embodiment, the secondary device may be an actuator from a robot or a sensor. Next, at S620, a wireless communication cycle of the primary device in communication with the wireless MCCL is determined. Then, at S630, a wired communication cycle between the wired MCCL and the secondary device via the wired port is determined. Afterwards, at S640, a start time of the wireless communication cycle is aligned, or synchronized, to a start of the wired communication cycle. The alignment may include configuring the wired communication cycle based on the wired communication cycle. At S650, the feedback signal is then sent to the primary device at the start time of the wired communication cycle that has been aligned to the start time of the wireless communication cycle.

As discussed above, by synchronizing the wireless cycle start time with the wired cycle start time, the timing uncertainty while the signal is being transferred through the hub 130 may be greatly reduced. Also, latency time that occurs from wireless transmission of signals to wired transmission via IO-link may be reduced.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method of providing communication between a wireless mission critical communication link (MCCL) and a wired MCCL, comprising:
   receiving a signal from a primary device through the wireless MCCL;
   determining a wireless communication cycle of the primary device;
   determining a wired communication cycle of a secondary device, wherein the secondary device is connected via the wired MCCL;
   synchronizing a start time of the wired communication cycle to a start of the wireless communication cycle; and
   sending the received signal to the secondary device at the synchronized start time of the wired communication cycle.

2. The method of claim 1, wherein synchronizing the start time of the wired communication cycle further comprises:
   configuring the wired communication cycle based on the wireless communication cycle.

3. The method of claim 1, further comprising:
   receiving a feedback signal from the secondary device over the wired MCCL;
   synchronizing a start time of the wireless communication cycle to a start of the wired communication cycle; and
   sending the feedback signal, over the wireless MCCL, to the primary device at the aligned start time of the wired communication cycle.

4. The method of claim 3, further comprising:
   configuring the wireless communication cycle based on the wired communication cycle.

5. The method of claim 1, wherein each of the wired communication cycle and the wireless communication cycle are set to a constant latency.

6. The method of claim 1, wherein the wireless MCCL is a which link operates based on an IO-Link wireless standard, and wherein the wired MCCL operates based on a wired IO-Link.

7. The method of claim 6, wherein the primary device is a master device controlling the secondary device.

8. The method of claim 1, wherein the primary device and the secondary device are connected to a hub configured to facilitate the connection between devices connected to the wired MCCL and the wireless MCCL.

9. A non-transitory computer readable medium having stored thereon instructions for causing a processing circuitry to execute the method of claim 1.

10. A hub for interfacing between a wireless mission critical communication link (MCCL) and a wired MCCL, comprising:
    a wired interface a providing a physical layer connectivity to the wired MCCL;
    a plurality of ports coupled to the wired interface;
    a wireless interface providing a physical layer connectivity to the wireless MCCL; and
    a processor; and
    a memory, the memory containing instructions that, when executed by the processing circuitry, configure the hub to:
      receive a signal from a primary device through the wireless MCCL;
      determine a wireless communication cycle of the primary device;
      determine a wired communication cycle of a secondary device, wherein the secondary device is connected via the wired MCCL;
      synchronize a start time of the wired communication cycle to a start of the wireless communication cycle; and
      send the received signal to the secondary device at the synchronized start time of the wired communication cycle.

11. The hub of claim 10, wherein the hub is further configured to:
    configure the wired communication cycle based on the wireless communication cycle.

12. The hub of claim 10, wherein the hub is further configured to:
    receive a feedback signal from the secondary device over the wired MCCL;
    synchronize a start time of the wireless communication cycle to a start of the wired communication cycle; and
    send the feedback signal, over the wireless MCCL, to the primary device at the aligned start time of the wired communication cycle.

13. The hub of claim 10, wherein the hub is further configured to:

configure the wireless communication cycle based on the wired communication cycle.

14. The hub of claim 10, wherein each of the wired communication cycle and the wireless communication cycle are set to a constant latency.

15. The hub of claim 10, wherein the wireless MCCL is a link which operates based on an IO-Link wireless standard, and wherein the wired MCCL operates based on a wired IO-Link.

16. The hub of claim 15, wherein the primary device is a master device controlling the secondary device.

17. The hub of claim 10, wherein the hub is further configured to: convert control signals received on the wired MCCL to control signals in a format compliant with the wireless MCCL, and vice versa.

\* \* \* \* \*